United States Patent [19]

Michels et al.

[11] Patent Number: 4,569,410

[45] Date of Patent: Feb. 11, 1986

[54] APPARATUS FOR CARRYING AND TRANSPORTING LOADS

[76] Inventors: Hartwig Michels, Steinplattenweg 10; Knud Klingler, Treitschkestrasse 13, both of D-8500 Nurnberg, Fed. Rep. of Germany

[21] Appl. No.: 598,324

[22] PCT Filed: Aug. 5, 1982

[86] PCT No.: PCT/EP83/00212

§ 371 Date: Mar. 20, 1984

§ 102(e) Date: Mar. 20, 1984

[87] PCT Pub. No.: WO84/00740

PCT Pub. Date: Mar. 1, 1984

[30] Foreign Application Priority Data

Aug. 18, 1982 [DE] Fed. Rep. of Germany ....... 3230753

[51] Int. Cl.$^4$ ................................. B60V 1/00
[52] U.S. Cl. .................... 180/125; 180/127; 180/129
[58] Field of Search .................. 180/125, 127, 129

[56] References Cited

U.S. PATENT DOCUMENTS 3,805,913  4/1974  Jackeo .................. 180/125 X
3,826,329  7/1974  Crummins et al. ........... 180/125
4,441,571  4/1984  Wood .................... 180/125 X

FOREIGN PATENT DOCUMENTS 1577166   8/1969  France .
1210261  10/1970  United Kingdom .
1261014   1/1972  United Kingdom ........... 180/127
1423656   2/1976  United Kingdom ........... 180/127
1491100  11/1977  United Kingdom .

Primary Examiner—Larry Jones
Attorney, Agent, or Firm—Steele, Gould & Fried

[57] ABSTRACT

An apparatus for carrying and transporting loads over a surface comprises: a supporting platform; a flexible damping ring fixed to the supporting platform along a circular closed-loop line of contact and defining a chamber adapted for inflation upon introduction of a pressurized medium; an uplift chamber defined between the supporting platform, the surface and an interior wall portion of the damping ring, the interior wall portion of the damping ring forming a lateral partition between the chambers during operation and the damping ring having at least one aperture enabling fluid communication between the chambers; and, the interior wall portion of the damping ring being stretchable and the remaining wall portions of the damping ring being substantially unstretchable, whereby introduction of the pressurized medium will effect inflation of the damping ring and pressurization of the uplift chamber, the pressurized medium escaping from the uplift chamber as a fluid film of substantially uniform thickness and pressure between the damping ring and the surface, notwithstanding movement of the apparatus over uneven and irregular surfaces. The apparatus may also comprise an annular disc fixed interiorly of the damping ring chamber at a uniform distance from the supporting platform, the disc having an outer circumference extending outwardly at least as far as does the closed-loop line of contact. The apparatus may further comprise a connecting chamber bounded at least partly by the supporting platform and forming a fluid interconnection between the damping ring chamber and the uplift chamber.

17 Claims, 6 Drawing Figures

APPARATUS FOR CARRYING AND TRANSPORTING LOADS

BACKGROUND OF THE INVENTION

1. Field of the Invention

The invention relates to an apparatus for carrying and transporting loads comprising a supporting platform and an air cushion device. The air cushion devise comprises a flexible damping ring inflatable by the introduction of a pressure medium, fixed to the supporting platform along a circular closed loop line of contact in sealing relationship, and an uplift chamber formed between the supporting platform, the inflated damping ring and the area of support. The chamber of the damping ring comprises at least one aperture through which it communicates with the uplift chamber and from which, in the operational condition, the pressure medium emerges between the damping ring and the area of support to form a fluid film.

2. Prior Art

Apparatus typical of the prior art is shown in German accepted specification No. 19 48 304. Such apparatus requires virtually level, very smooth areas of support. In order to compensate for irregularities, minor cracks and other non-uniformities in the area of support, a large consumption of pressure medium, and thus of energy, is necessary because of the narrow annular sliding surface which is only a few millimeters wide, and which in the event of irregularities, causes the pressure medium to escape rapidly. Problems also arise if the pressure of the escaping pressure medium is subject to wide fluctuations such as may arise e.g. when passing from an even to an uneven or from a smooth to a rough or porous area of support. This may frequently result in undesirable cyclical hopping movements due to resonance vibrations of the apparatus. In addition, high frequency vibrations arise which are accompanied by noise pollution. During travelling over cracks and steps the resulting rapid escape of pressure medium may often result in tilting, i.e. the damping ring will then rest in firm contact on the area of support, and further movement may involve a risk of the ring being turned inwards, and then even being torn or ripped off the support platform, resulting in failure of the entire transport device.

A further disadvantage of the known apparatus resides in the low lifting level, for which reason it may be very difficult or impossible to move the apparatus underneath the loads. If relatively high pressures are employed, the walls of the damping ring must be constructed of a fluid-tight, very strong material of low elasticity. In this context, the bulk of the load has to be carried by the outer peripheral margin. If this margin is reinforced by endless metal rings, which prevent radial deflection, high frequency noisy vibrations result even in the event of only slight alterations in pressure.

SUMMARY OF THE INVENTION

The disadvantages of the prior art are overcome by an apparatus for carrying and transporting loads over a surface, the apparatus comprising: a supporting platform; a flexible damping ring fixed to the supporting platform along a circular closed-loop line of contact and defining a chamber adapted for inflation upon introduction of a pressurized medium; an uplift chamber defined between the supporting platform, the surface and an interior wall portion of the damping ring, the interior wall portion of the damping ring forming a lateral partition between the chambers during operation and the damping ring having at least one aperture enabling fluid communication between the chambers; and, the interior wall portion of the damping ring being stretchable and the remaining wall portions of the damping ring being substantially unstretchable, whereby introduction of the pressurized medium will effect inflation of the damping ring and pressurization of the uplift chamber, the pressurized medium escaping from the uplift chamber as a fluid film of substantially uniform thickness and pressure between the damping ring and the surface, notwithstanding movement of the apparatus over uneven and irregular surfaces.

According to a further aspect of the invention, the apparatus may further comprise an annular disc disposed interiorly of the damping ring chamber at a uniform distance from the supporting platform, the disc having an outer circumference extending outwardly at least as far as does the closed-loop line of contact. Advantageous modifications of the invention are shown in the drawings, described in detail hereinafter, and set forth in the claims.

By the choice of different materials for the walls of the damping ring, a practically unstretchable, very strong, fluid-tight material being used for the outside capable of absorbing high pressures, and a stretchable material of the partitioning wall directed towards the lifting force chamber, the damping ring may easily and readily change its volume as a function of the supply and discharge of pressure medium which simultaneously—because of the common partitioning wall—brings about a volume increase or decrease, as the case may be, of the lifting chamber. The generation of resonnance vibrations and of flapping of the inflatable body is thereby substantially avoided. The deflectable wide sealing area directed towards the supporting surface is able to adapt to unevennesses in the ground such that the fluid film which is formed remains almost constant with respect to its thickness and the required pressure. Additional escape of medium which would necessitate an increased pressure medium supply is inhibited. This wide sealing area virtually forms a kind of labyrinth seal whereby unevenness, steps, cracks and other irregularities of a supporting surface can be compensated for in a manner involving minimised consumption of pressure medium and energy respectively. By the design of the walls of the damping ring, so as to be of different stretchability, an optimal lifting level is made possible as a function of the pressure medium supply.

The provision of a ring according to the invention inside the damping chamber, avoids inward deflection of the latter, and thereby the tilting effect.

The apparatus may operate even at pressures below 1 bar and above 4 bars. Experiments have shown that known devices may consume 50% greater amounts of pressure medium as compared with apparatus in accordance with the invention.

BRIEF DESCRIPTION OF THE DRAWINGS

In the following, the invention will be further explained with reference to working examples shown in the drawings.

In all illustrated working examples identical parts are denoted by the same reference numbers and will be explained once only.

DETAILED DESCRIPTION OF THE PREFERRED EMBODIMENTS

Figure 1:
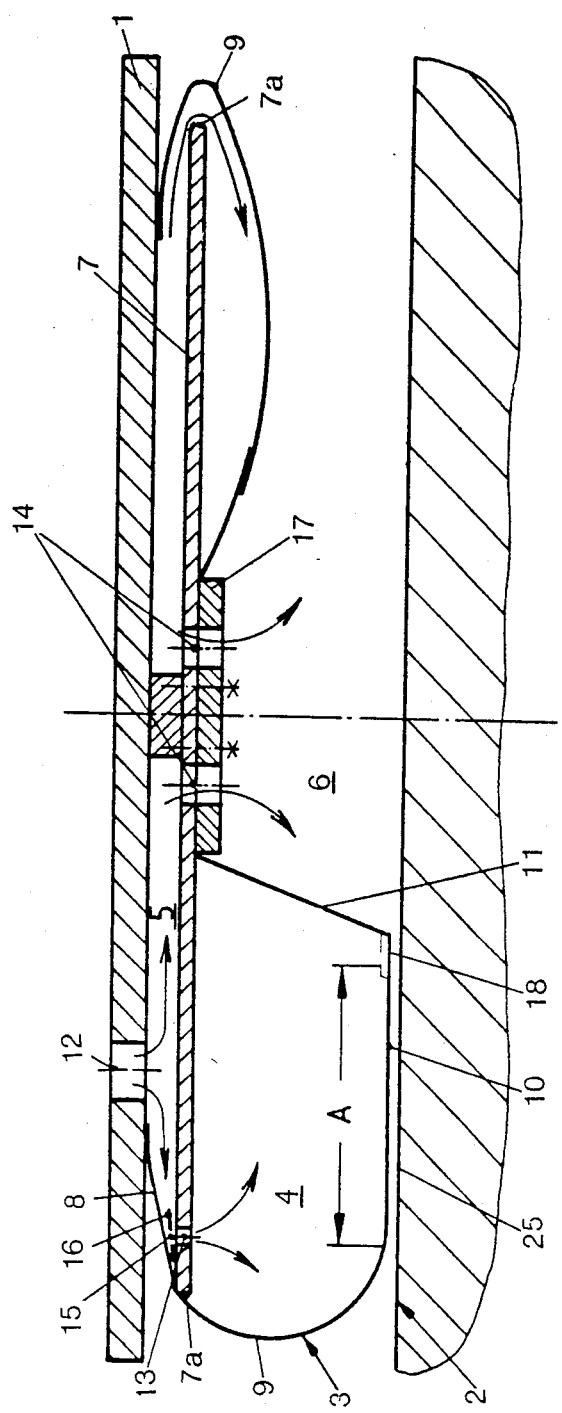
FIG. 1 is a first working example in radial section in which the lefthand half illustrates the damping chamber in the inflated condition while in the right-hand half the position of rest is illustrated.
Figure 2:
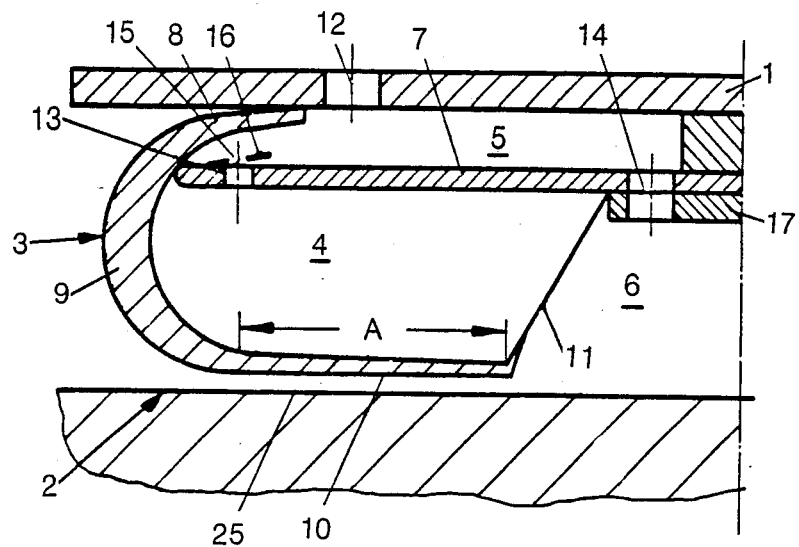
FIG. 2 is a second working example in radial section through one half thereof.

The apparatus as illustrated in FIGS. 1 and 2 comprises a supporting platform 1, on which directly, or by way of a carrier pallet (not illustrated) connected thereto, a load is supported. The supporting or carrier platform comprises supports known per se, which are not illustrated and which support the respective load-bearing platform in the condition of rest of the apparatus on the supporting surface 2. (In FIG. 4 a central support is indicated).

Underneath the supporting platform 1 an inflatable damping ring 3, which encloses a damping ring chamber 4, is provided, as well as a disc-shaped connecting chamber 5 and a lifting chamber 6. The annular damping chamber 4 is bounded in these examples by an annular disc 7 which, jointly with the side wall 8 and the supporting platform 1, also bounds the connecting chamber 5. The chamber 4 is further bounded by a lateral outer wall 9, a bottom wall 10 and an inner partition 11 separating the chamber 4 from a lifting chamber 6. The lifting chamber 6 is defined by the central region of the annular disc 7, the partition 11 and the supporting surface 2.

Normally, inter alia for stress and load bearing reasons, a circular configuration of the connecting line between the supporting platform and the inflatable damping ring is most appropriate, although in principle, different configurations are possible as well.

A bore 12 is provided in the supporting platform 1 which otherwise forms an upper boundary of the connecting chamber 5. This bore 12 permits the introduction of a pressure medium into the connecting chamber 5 by means of a source of pressure medium through connecting lines (neither being illustrated). The connecting chamber 5 is in direct communication with the damping ring chamber 4 through an aperture 13 in the annular disc 7 and in indirect communication with the uplift chamber 6 through at least one further aperture 14 through the annular disc 7.

The aperture 13 in the annular disc 7 is radially outside the line of contact of the damping ring 3 against the support platform 1. However, it may also be provided in alignment with the axis of the bore 12 for the pressure medium feed centrally related thereto, or excentrically and within the line of contact. The aperture 13 of the annular disc on the side of the connecting chamber 5 comprises a deflectable throttle flap 15 having an aperture 16 covering the aperture 13 of the annular disc and having a cross-sectional area smaller than that of the aperture 13 of the annular disc.

The outer wall 9 of the damping ring chamber 4 is produced integrally with the side wall 8 of the connecting chamber 5 and forms an extension thereof.

The free end of the side wall 8 is connected by screw connections or by vulcanisation in a fluid-tight manner to the supporting platform 1. The free end of the partition wall 11 is fitted in a corresponding manner between the apertures 13 and 14 of the annular disc to the annular disc 7, disc 7 serving as a bottom of the connecting chamber 5. An interchangeable nozzle plate 17 may optionally be provided.

Figure 3:
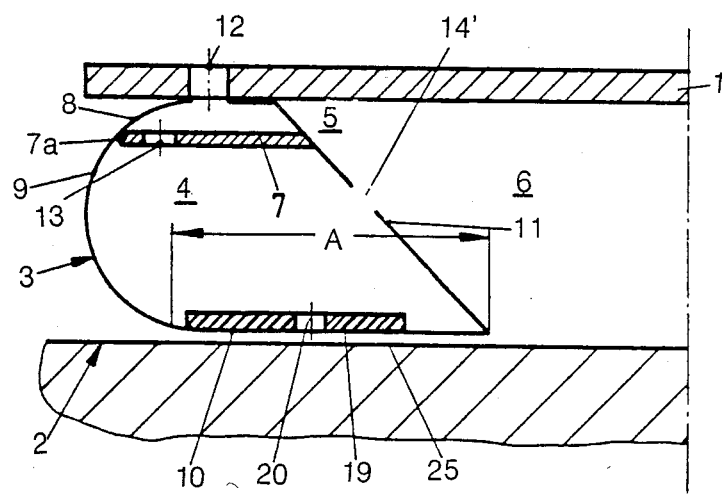
FIG. 3 is a third working example in radial section through one half thereof.
Figure 4:
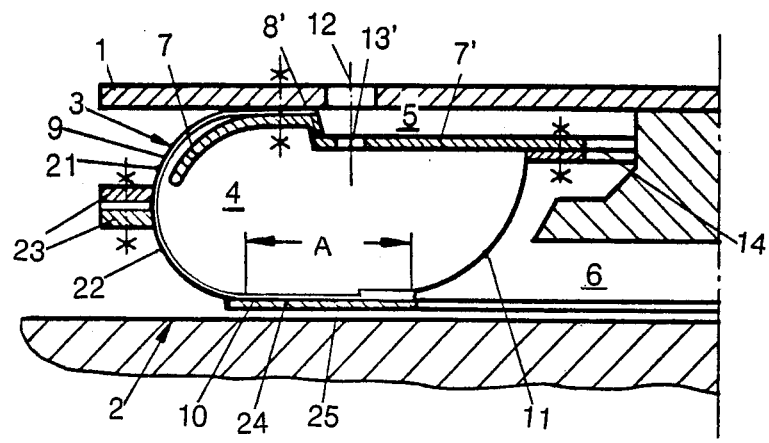
FIG. 4 is a fourth working example in radial section through one half thereof.

In the embodiments according to FIGS. 1, 3 and 4, the side wall 8, the outer wall 9 and the bottom wall 10 of the flexible damping ring 3 are composed of a tear-resistant material which is practically non-extensible (that is, substantially unstretchable), e.g. a rubber-coated fabric. In the transition region to the partition 11, the bottom wall 10 may on its inside and/or outside comprise reinforcement rings 18 (FIG. 1) preferably of the same material. The partition 11 is composed of a readily extendable (that is, stretchable) rubber.

The working example according to FIG. 3 is of similar construction as that illustrated in FIGS. 1 and 2. However, in that case the connecting chamber 5 is connected only to the damping ring chamber The connections of the damping ring chamber 4 to the uplift chamber 6 are provided through apertures 14' in the partition 11 such that the pressure medium, before entering the uplift chamber 6, has to flow through the connecting chamber 5 into the damping chamber 4. At least on a substantial portion of the inner bottom wall 10, a foam rubber layer 19 (FIG. 3) may be applied to effect damping of vibrations without interfering with the deflection of the bottom wall 10 in a vertical direction.

The bottom wall 10 may also be provided with small apertures 20 (FIG. 3) preferably provided uniformly spaced on a circumferential circle.

Figure 5:
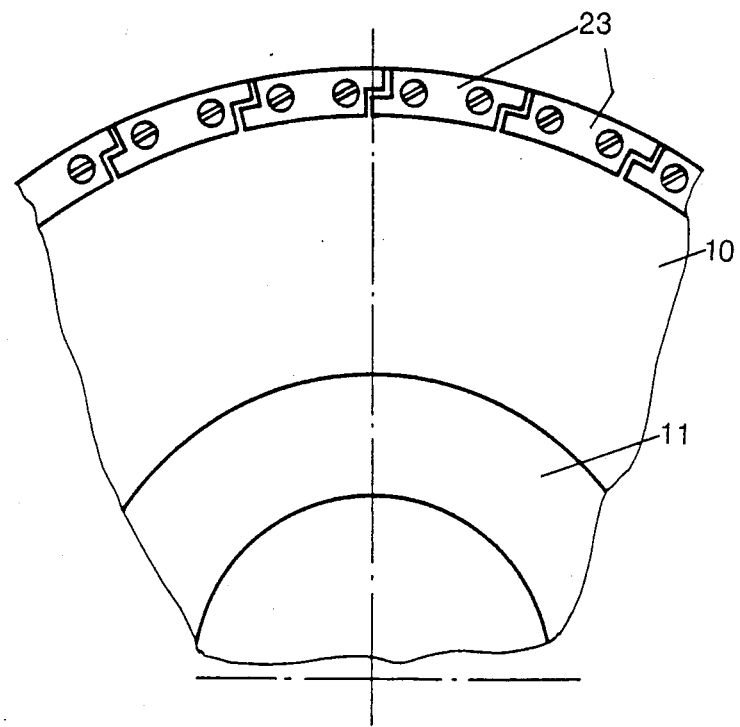
FIG. 5 is a section of the reversed plan view of the working example according to FIG. 4.

In the case of the working example illustrated in FIG. 4, the connecting chamber 5 is provided with rigid side walls 8' and a rigid bottom 7'. An extension of the fitting flange of the side wall 8' may be provided to serve as the annular disc 7. In addition, the outer wall 9 comprises an upper and a lower portion 21 and 22 respectively, connected in the region of the largest circumference by upper and lower annular clamping plates 23 fitted close to one another in a fluid-tight manner. Adjoining plates 23 may be provided (See FIG. 5) in an interengaging manner. The annular clamping plates 23 reinforce wall 9 in the region where, in operation, the highest pressure has to be accommodated. Flapping, and thus noise generation, is avoided by the use of individual annular clamping plates 23 instead of continuous rings.

On the outside of the bottom wall 10 an abrasion resistant plastics layer 24 (FIG. 4) can be applied for increasing the wear-resistance. It is also possible to form the rigid connecting chamber 5 as a replaceable or interchangeable hood disposed above the supporting plate 1 (not illustrated), in which case the apertures 13 and 14 have to be provided in the supporting platform 1. In that manner it would be possible to adjust the distance and the eccentricity of the pressure medium feed aperture 12 in the hood in relation to the aperture 13 merely by changing the hood.

Figure 6:
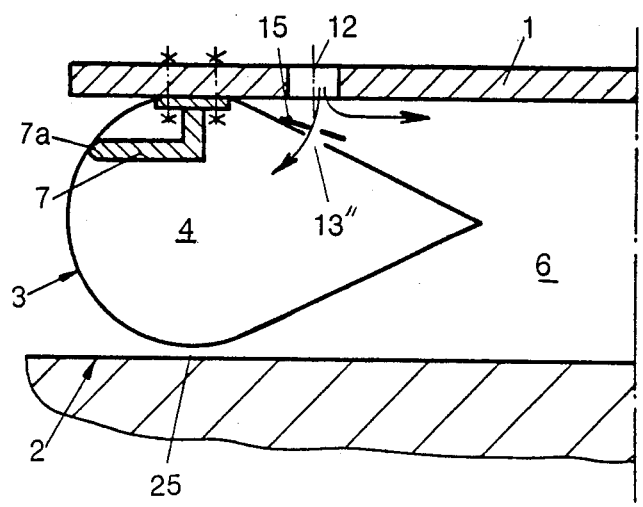
FIG. 6 is a simple working example comprising a ring serving as a disc.

In the embodiment illustrated in FIG. 6 a connecting chamber is dispensed with. In that case the pressure medium is introduced directly through the bore 12 in the supporting platform 1 into the uplift chamber 6. The wall of the damping ring 3 is composed of a single piece, and in the condition of rest, bears against the support platform 1. An aperture 13" covered by a throttle flop 15 is provided in the wall directly opposite bore 12, through which aperture the pressure medium may enter into the damping ring chamber 4. The damping ring chamber 4 also communicates through aperture 13" with the uplift chamber 6. Inside the damping ring chamber 4 an annular disc 7 is fixed, e.g. by flange connections. In this embodiment the entire wall of the expandable damping chamber 4 is composed uniformly of practically non-extensible (substantially unstretchable) tear-resistant material, the lateral wall being essentially foldable or accordion-like. However, a design with a stretchable wall portion analogous to the other embodiments is equally possible.

The apparatus according to FIG. 1 operates as follows:

A pressure medium introduced through the bore 12 into the connecting chamber 5 spreads therein and passes through the aperture 13 in the annular disc 7, covered by the throttle flap 15 including the throttle aperture 16, and through the annular gap existing in the position of rest (FIG. 1 right half) between the outer margin 7a of the annular disc 7 and the intergral side wall 8 and the outer wall 9, into the damping chamber 4 and through the aperture 14 directly into the uplift chamber 6. Depending on whether or not the outlet of the pressure medium supply is in axial relationship to a corresponding bottom aperture 13 or aperture 13' respectively, and on the level difference therebetween as well as the size of the throttle aperture 16, the pressure medium flows into the damping ring chamber causing expansion thereof at a lower or higher rate. The smaller the distance of the feed aperture 12, for the pressure medium, from the inlet aperture 13 in the damping chamber 4, the larger is the lifting stroke which may be attained with this apparatus for a given pressure of the pressure medium.

As expansion of the damping ring 3 increases, the annular ring becomes closed and the integral side wall 8 and outer wall 9 fits in sealing relationship against the outer margin 7a. In that case, the connecting chamber 5 communicates only through the throttle aperture 16 with the connecting chamber 5. Simultaneously with the expansion of the damping ring chamber 4, pressure medium enters into the uplift chamber 6 from the connecting chamber 5 through the aperture(s) 14, and where appropriate, the nozzle plate 17. As the damping ring chamber 4 expands, the bottom wall 10 comes to rest in the form of a broad substantially parallel sealing ring A against the support area 2, permitting prressure to build up in the uplift chamber 6. The pressure in the damping ring chamber 4 is absorbed by the tear-resistant outer wall 9 and the bottom wall 10. No noteworthy pressure is applied on to the partition 11 since under operating conditions, pressure equalisation is brought about through the connection of the damping ring chamber 4 and the uplift chamber 6. In the event of an appropriate pressure medium supply, a gap 25 is formed between the bottom wall 10 and the support area 2 by virtue of a pressure medium film there emerging, which causes the load to be transported to float. The broad sealing ring A which is formed is able to easily compensate for irregularities of the supporting area 2 by virtue of its tiltability and its adaptability (contour hugging ability).

Whenever a convexity in the supporting area 2 is travelled over, a pressure increase in the damping ring chamber 4 takes place, which is compensated for by the connection with the uplift chamber 6. This pressure compensation will take place more rapidly in the event of a throttle flap 16 being available because of the deflection of the latter, which will then expose a larger opening cross-section. In the event of a more substantial pressure drop it is also possible for the integral side wall 8 and outer wall 9 to be released from the outer rim 7a. The result is an increased exit of pressure medium between the sealing ring A and the supporting area 2. Once the convexity has been travelled over, a low pressure prevails in the damping ring chamber 4 which is rapidly restored again to a predetermined level by the annular gap. The application of the throttle flap 15 over the aperture 13 then causes the pressure build-up to proceed more slowly and retardedly, and therefore in a damped manner, through the smaller aperture 16 in the throttle flap 15. In the event of a depression in the supporting area to be travelled over, the same events proceed in the reverse sense.

In the event of rough and/or cracked supporting areas, the broad sealing ring A provides a kind of labyrinth effect thereby permitting the required pressure to be maintained in the uplift chamber 6.

These effects permit the successful negotiation of uneven, rough and cracked sliding surfaces with a minimum consumption of pressure medium or energy. Because in the case of different flow throughputs through the gap 25, different pressure will be established in the uplift chamber 6, a regulatable lifting stroke as a function of the flow throughput is attained. The larger the flow throughput, the higher will be the pressure in the uplift chamber 6. It is thus possible for loads to be moved thereunder with a low flow throughput and thereafter to lift and move away such loads by increasing the flow throughput.

The apparatus according to FIG. 2 operate in the same manner as that in accordance with FIG. 1.

In the case of the apparatus according to FIG. 3 the pressure medium enters into the connecting chamber 5, from which it flows into the damping chamber 4 through the callibrated aperture 13 in the annular disc 7 and the initially prevailing annular gap between the outer ring 7a and the integral side wall 8 and the outer wall 9 (which gap closes upon inflation of the damping ring chamber 4). From there, it passes through the bore(s) 14' in the partition 11 in the uplift chamber 6, and under operating conditions, also through the bore 20 in the bottom wall 10 into the gap 25 which is formed.

In the event of the apparatus according to FIG. 4 there exists a rigid connecting chamber 5 of constant volume. From the connecting chamber 5, the pressure medium can only pass into the damping chamber 4 through the aperture 13' in the bottom 7'. The connecting chamber 5 is connected directly to the uplift chamber 6 by the aperture 14. Damping chamber 4 and uplift chamber 6 communicate through the apertures 13' and 14'.

In the case of the apparatus illustrated in FIG. 6 the aperture 13", covered by a deflectable throttle flap 15 in the position of rest, is directly opposite the outlet of the bore 12 for the feeding of a pressure medium. Accordingly, when the pressure medium is fed, the damping ring chamber 4 becomes inflated, causing the aperture 13" to be progressively moved away from the outlet of the bore 12, such that the pressure medium will also flow into the uplift chamber 6 and build up the fluid film in the gap 25.

Preferably, in all embodiments, a ring 7 is provided inside the damping chamber 4, the free outer edge 7a of which has a radius at least as large and preferably larger than the radius of the circular line of contact of the damping ring 3 against the support platform 1. Such a ring prevents the outer wall 9 from folding inwardly. However, it also ensures that in the event of "sticking" of the bottom wall 10 against a support 2 in the event of an operating fault, the direction of the force application onto the point of affixation of the damping ring 3 to the support platform 1 is practically unchanged. The traction of the "sticking" bottom wall is deflected by the ring 7, such that a tearing away of the damping ring 3 from the support platform 1 is avoided substantially. Also, in fixing the damping ring 3 to the supporting platform 1, it is only necessary to take into account tensile forces in one direction.

For reasons of stability, it is necessary to provide at least three devices under a load-bearing platform, which in the event of eccentric loads, will be subjected to different loading. Due to the sealing ring A being deflectable as a function of the load a self-regulating effect is attained which, to a certain extent, compensates for different loadings of the individual devices, for which reason no separate pressure regulating devices are needed for the individual devices.

Due to the design according to the invention of the wall of the damping ring chamber 4 to be composed of a stretchable and an unstretchable portion, the chamber can have a very large volume which, in operation, can vary more substantially than would be the case with smaller chambers, and this contributes to the stability of the function. The connecting chamber 5 serves as a compensating chamber which promotes stability. These measures serve to avoid vibrations, hopping effects and the flapping about of walls of the damping ring chamber. The bore passages 20 in the bottom wall 10 can form small local air cushions which serve for additional "lubrication" and which, in the event of major cracks, maintain the functionability of the apparatus.

Thus, it was found that travelling becomes possible even over uneven surfaces, such as convexities and concavities as well as minor cracks and rough and slightly porous areas of support, even during movement alternating with smooth and planar areas of support, without substantially increasing the consumption of pressure medium and thereby of energy, while simultaneously self-induced vibrations which may result in hopping movements and which involve flapping of the wall of the inflatable body and involving noise generation are avoided. Moreover, the apparatus was found to regulate the lifting level as a function of the throughput quantity and the tilting effect is avoided.

The claims which follow are to be considered an intergral part of the present disclosure.

What is claimed is:

1. An apparatus for carrying and transporting loads over a surface, the apparatus comprising:
   a supporting platform;
   a flexible damping ring fixed to the supporting platform along a circular closed-loop line of contact and defining a chamber adapted for inflation upon introduction of a pressurized medium;
   an uplift chamber defined between the supporting platform, the surface and an interior wall portion of the damping ring, the interior wall portion of the damping ring forming a lateral partition between the chambers during operationn and the damping ring having at least one aperture enabling fluid communication between the chambers; and,
   the interior wall portion of the damping ring being stretchable and the remaining wall portions of the damping ring being substantially unstretchable, whereby introduction of the pressurized medium will effect inflation of the damping ring and pressurization of the uplift chamber, the pressurized medium escaping from the uplift chamber as a fluid film of substantially uniform thickness and pressure between the damping ring and the surface, notwithstanding movement of the apparatus over uneven and irregular surfaces.

2. Apparatus according to claim 1, wherein that wall portion of the damping ring adjacent to the surface, when the damping ring is inflated, forms a broad deflectable sealing surface of annular disc shape disposed approximately parallel to the surface during movement.

3. Apparatus according to claims 1 or 2, further comprising an annular disc disposed interiorly of the damping ring chamber at a uniform distance from the supporting platform, the disc having an outer circumference extending outwardly at least as far as does the closed-loop line of contact.

4. Apparatus according to claim 3, further comprising a connecting chamber bounded at least partly by the supporting platform and forming a fluid interconnection between the damping ring chamber and the uplift chamber.

5. Apparatus according to claim 4, wherein the connecting chamber is disposed underneath the supporting platform, the interior partition wall portion is sealably affixed to a bottom wall of the connecting chamber and the bottom wall of the connecting chamber forms a part of the wall of the damping ring chamber.

6. Apparatus according to claim 5, wherein a further portion of the side wall of the connecting chamber forms an extension of an outer wall portion of the damping ring.

7. Apparatus according to claim 6, wherein the bottom wall of the connecting chamber is formed by the annular disc, an upper extension of the outer wall portion forms a side wall of the connecting chamber and the outer circumference of the annular disc is in sealing contact with the outer wall portion when the damping ring is inflated.

8. Apparatus according to claim 7, wherein the supporting platform has a bore for feeding the pressure medium to the connecting chamber, and the distance of the bore to the at least one aperture in the damping ring chamber is independently adjustable.

9. Apparatus according to claim 8, wherein the wall portions of the damping ring are composed of the same elastic material and the stretchability of the lateral partition portion is due to the material being stretched thinner than the remaining wall portions.

10. Apparatus according to claim 9, further comprising a throttle flap for the at least one aperture in the damping ring chamber, the throttle flap having a small aperture and being deflectable by excess pressure in the damping ring chamber.

11. Apparatus according to claim 10, wherein the outer wall portions of the damping ring chamber comprise upper and lower portions, and further comprising a plurality of clamping plates for interconnecting the upper and lower portions in fluid-tight relationship along their circumferential edges, the clamping plates forming a composite annular seal.

12. Apparatus according to claim 2, wherein the surface facing wall portion of the damping ring chamber comprises passages of relatively small diameter.

13. Apparatus according to claim 2, wherein the interior of the surface facing wall portion of the damping ring chamber comprises a foam rubber cover.

14. Apparatus according to claim 2, wherein the exterior of the surface facing wall portion comprises an abrasion-resistant plastics layer.

15. An apparatus for carrying and transporting loads over a surface, the apparatus comprising:
- a supporting platform;
- a flexible damping ring fixed to the supporting platform along a closed-loop line of contact and defining a chamber adapted for inflation upon introduction of a pressurized medium;
- an annular disc fixed interiorly of the damping ring chamber at a uniform distance from the supporting platform, the disc having an outer circumference extending outwardly at least as far as does the closed-loop line of contact;
- an uplift chamber defined between the supporting platform, the surface and an interior wall portion of the damping ring, the interior wall portion of the damping ring forming a lateral partition between the chambers during operation and the damping ring having at least one aperture enabling fluid communication between the chambers; and,
- the interior wall portion of the damping ring being stretchable and the remaining wall portions of the damping ring being substantially unstretchable, whereby introduction of the pressurized medium will effect inflation of the damping ring and pressurization of the uplift chamber, the pressurized medium escaping from the uplift chamber as a fluid film of substantially uniform thickness and pressure between the damping ring and the surface, notwithstanding movement of the apparatus over uneven and irregular surfaces.

16. The apparatus of claim 15, wherein the closed-loop line of contact and the other circumference of the annular disc are circular in shape.

17. The apparatus of claim 16, wherein the annular disc is the outer portion of a circular plate fixed to the supporting platform at a location exteriorly of the damping ring chamber, the damping ring having one closed-loop line of contact with the supporting platform and another closed-loop line of contact with the circular plate.

* * * * *